Figure 1:
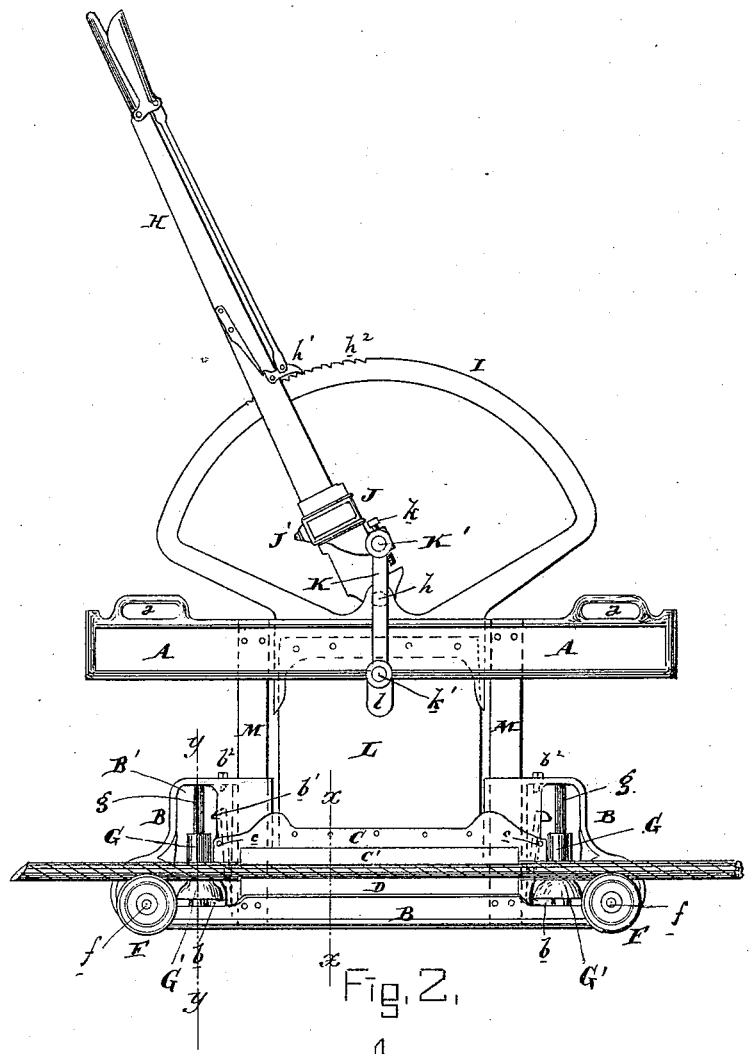

(No Model.)  5 Sheets—Sheet 1.

A. E. HOVEY.
GRIPPING DEVICE FOR CABLE RAILWAYS.

No. 347,935.  Patented Aug. 24, 1886.

WITNESSES:
William S. McWade
Harry R. Schafer

INVENTOR
Asa. E. Hovey
BY
ATTORNEY (No Model.) 5 Sheets—Sheet 2.
A. E. HOVEY.
GRIPPING DEVICE FOR CABLE RAILWAYS.
No. 347,935. Patented Aug. 24, 1886.
Fig. 3
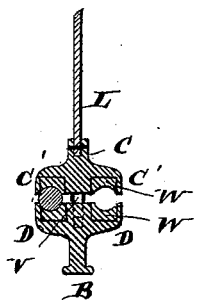
Fig. 4
Fig. 5
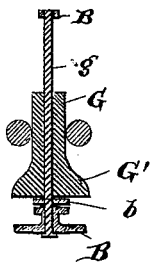
WITNESSES:
William S. McWade
Harry P. Schafer
INVENTOR
Asa E. Hovey
BY 
ATTORNEY (No Model.) 5 Sheets—Sheet 3.
A. E. HOVEY.
GRIPPING DEVICE FOR CABLE RAILWAYS.
No. 347,935. Patented Aug. 24, 1886.
Fig. 6
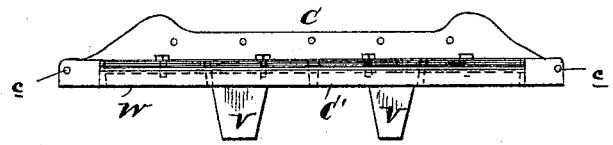
Fig. 7
Fig. 8
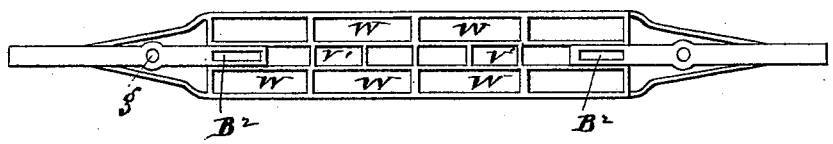
Fig. 9
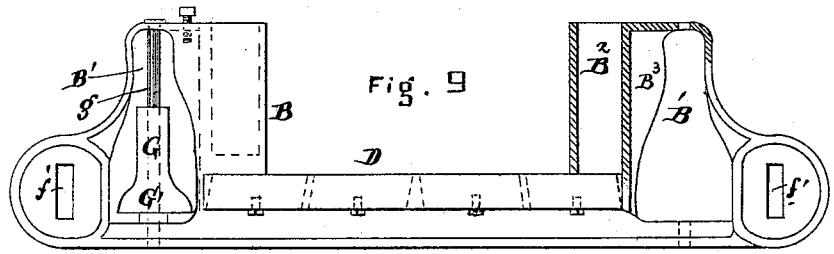
WITNESSES:
William S. McWade
Harry P. Schafer
INVENTOR
Asa E. Hovey
BY 
ATTORNEY (No Model.)  5 Sheets—Sheet 4.
A. E. HOVEY.
GRIPPING DEVICE FOR CABLE RAILWAYS.
No. 347,935. Patented Aug. 24, 1886.
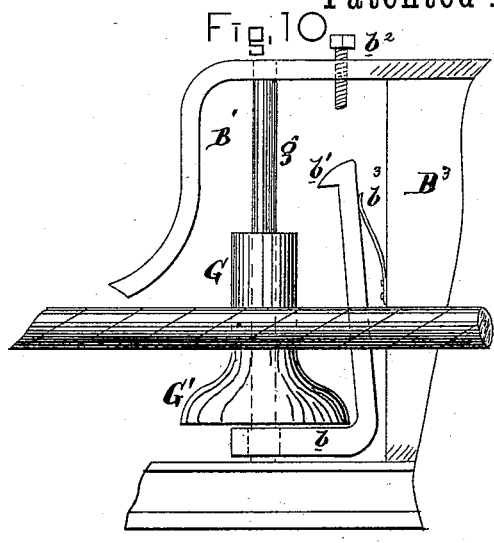
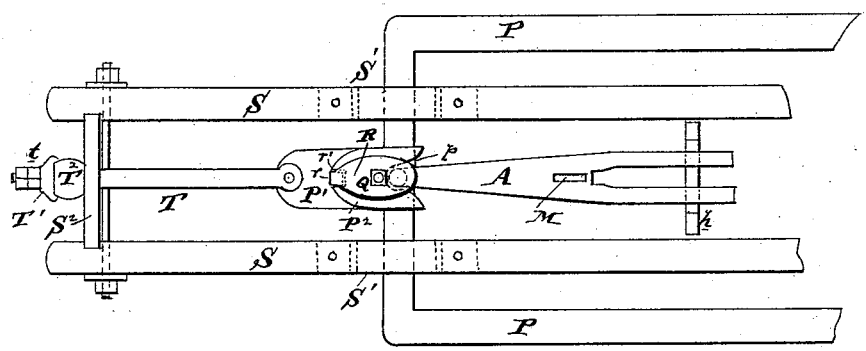
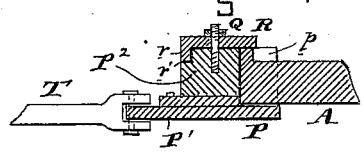
WITNESSES:
William S. McWade
Harry P. Schafer
INVENTOR
Asa E. Hovey
BY
ATTORNEY (No Model.)  5 Sheets—Sheet 5.

A. E. HOVEY.
GRIPPING DEVICE FOR CABLE RAILWAYS.

No. 347,935.  Patented Aug. 24, 1886.

UNITED STATES PATENT OFFICE.

ASA E. HOVEY, OF CHICAGO, ILLINOIS.

GRIPPING DEVICE FOR CABLE RAILWAYS.

SPECIFICATION forming part of Letters Patent No. 347,935, dated August 24, 1886.

Application filed March 4, 1884. Serial No. 122,976. (No model.)

*To all whom it may concern:*

Be it known that I, ASA E. HOVEY, of the city of Chicago, in the county of Cook and State of Illinois, have invented an Improvement in Gripping Devices for Cable Railways, of which the following is a specification.

My invention has reference to an improved gripping device for connecting and disconnecting cars with an endless rope or wire cable, which is arranged to run or travel in an underground conduit having a longitudinal slot opening therefrom into the atmosphere, and adapted to propel the car or other vehicle along the track. The gripping device runs inside the conduit, and is connected with the car by means of thin plates or bars of iron or steel, which extend up through the slot in the said conduit. The jaws are operated by a lever within the car or upon the platform.

My invention consists in a novel construction of mechanism for attaching the gripping device as an entirety to the car, and providing for its easy removal when required; further, in so forming and attaching the plates to the jaws which they support and operate that they admit of easy removal when worn; further, in providing the gripping-jaws with removable wearing-blocks; further, in combining with the gripping-jaws adjustable guide-rollers, whereby the wear of the cable on the jaws when unclamped may be reduced and kept to a minimum; further, in a novel device for throwing off or unshipping the cable when desired, and in many details of construction, all of which are fully set forth in the following specification, and shown in the accompanying drawings, which form part thereof.

The object of my invention is to provide a car adapted to cable railways with a perfect gripping device, which shall enable the operator to vary the clamping-power, and also regulate the same with a practically uniform throw of the lever; also, to guide the cable through the clamping-jaws and support it upon adjustable rollers, so that it shall not wear upon the jaws when the car is at rest; also, to enable the operator to throw off or unship the cable from the jaws at will, as is necessary in shifting from one cable to another, or when running the car off the cable for turning, &c.; also, to allow two cables to be gripped simultaneously, or one gripping while the other is released, or to shift the gripping-jaws onto an extra parallel cable.

Figure 2:
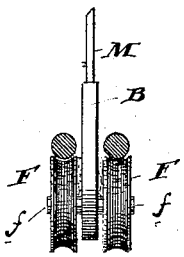
Figure 13:
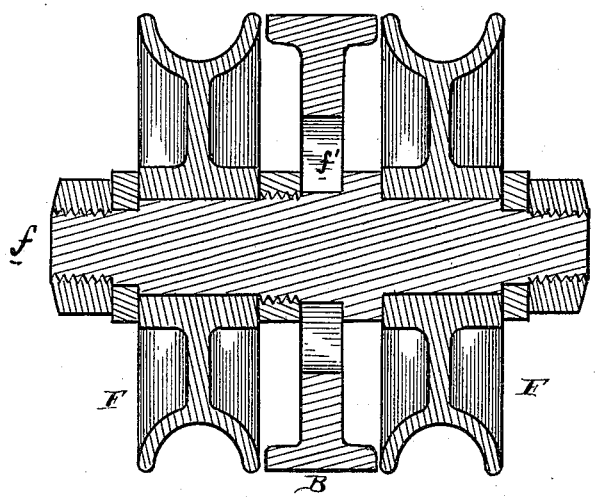

In the drawings, Figure 1 is a side elevation of the gripping device as an entirety. Fig. 2 is an end elevation of same. Fig. 3 is a vertical cross-section through the lower part of the device on the line $x\ x$ of Fig. 1. Fig. 4 is a plan view of the lower part of the grip. Fig. 5 is a vertical cross-section on the line $y\ y$ of Fig. 1. Fig. 6 is a side view of the upper jaw of the grip. Fig. 7 is a plan view of the upper jaw of the grip. Fig. 8 is a plan view, looking down on the lower jaw of the grip. Fig. 9 is a side view of the lower jaw of the grip. Fig. 10 is a detailed view of the pulley for throwing off the cable. Fig. 11 is a view of the method of attaching the grip to the car. Fig. 12 is a sectional view of part of Fig. 11. Fig. 13 is a cross-section on line 2 2 of Fig. 4, showing the manner of adjusting the guide-rollers in the grip-frames.

A is the supporting-frame, and is preferably provided with handles $a$, by which it may be lifted.

B is the lower jaw-frame, and has the stationary jaws D D extending out on each side. This frame has apertures or slots $B^2$, into which the vertical supporting bars or plates M M are placed, one at each end, and secured therein by removable pins or bolts. The upper ends of these plates M M are also received in apertures in the horizontal supporting-frame A, and are also secured therein by removable pins or bolts, as at the bottom. This enables the said bars or plates M to be turned upside down or turned end for end when their sides become worn by contact with the guide-slot of the conduit, due to vibration or in turning corners, thus increasing the durability of the device.

To each end of the frame B, and having their upper edges in line with the jaws D, are anti-friction and guide rollers F, whose axles $f$ are adjustable in a slot, $f'$, in the frame B, in the manner shown in Fig. 13, so that they can be adjusted up or down to compensate for the wear on the jaw D.

B' are apertures, in which are secured the vertical rods $g$, upon which the vertical guide-rollers G slide, the said rollers having cone or bell-shaped bottoms G', which, when raised, press upon the moving cable and cause it to run out of the gripping-jaws and off the rollers F, but when down they merely act as guide-rollers to prevent the cable abrading itself against the shank of the frame B. To raise these rollers G, I provide sliding hooks $b$, whose lower ends encircle the guide-rods $g$ below the rollers and slide upon said rods, the upper or vertical arms or legs of which hooks being guided in a slot, $B^3$, of the frame B, and furnished with lugs $b'$, having their upper edges beveled. These hooks are raised by pin $c$ on the movable clamping-jaw frame C, having the jaws C' C', which oppose the jaws D, hereinbefore specified. This jaw-frame C is guided by the frame B, and is raised and lowered by a plate, L, preferably of steel, and of considerable breadth, but of small thickness.

In practice the plates M are one-half inch and the plate L one-quarter of an inch in thickness. This forms a construction well adapted to round curves.

As the frame C is raised to lift the rollers G to discharge the cable, it first unclamps the cable, then raises rollers G to discharge the cable from out of the jaws, and when further raised the beveled edges of the lugs $b'$ strike the pins or set-screws $b^2$ and throw the free ends of the hooks back into the slots $B^3$, compressing springs $b^3$ and freeing them from the pins $c$, and allowing the rollers G to fall, and thereby be in their normal position upon clamping the same or another cable. This is particularly useful when shifting from one cable to another in the case of branch tracks.

The throw-off or unshipping devices above described are located at each end of the grip, to more readily unship the cable; but it is evident that if located only at the rear end of the grip it would work perhaps equally well, but the car would hardly be reversible.

The jaws D and C' have depressions or recesses W, into which the clamping or wearing blocks W' are placed, and secured by screws or otherwise. To keep the jaws in perfect line and prevent undue lateral strain, I provide the upper frame, C, with lugs V, which extend down and work through slots V' in the frame B.

Secured to the top of the plate L is the segment I, upon which the lever H works, it being pivoted at the center, $h$, from which the segment was described, and close to the top of the plate L. This lever may be locked in position by hand-latch $h'$ and ratchet-teeth on the segment, as is commonly found in machinery. It will be noticed that the said lever H and segment I are carried with the plate L in its vertical movements, and also with its clamping-jaw frame C. Upon the lower end of the lever H is a sleeve, J, secured in position upon the lever, and prevented from rattling by set-screw J', and is provided with an adjusting-screw, $k$, which works against a lug on the lever, and also a fulcrum-pin, K'. This fulcrum-pin K' is connected by links K with the frame A, to which it is pivoted or hinged, as at $k'$. $l$ is a slot in plate L, to allow the pin of the hinge $k'$ to pass through frame A, as the links K are on each side. From this construction it is seen that the lever H is provided with a movable and adjustable fulcrum, for the fulcrum-point K' moves upon the vibrating lever H, and by turning screw $k$ the distance between points K' and $h$ may be increased or decreased to vary the relative position of the fulcrum with respect to the point $h$, or vice versa, and enable the clamp-jaws C' to be adjusted so as to clamp with a uniform pressure with the same movement of the lever H, no matter how much the clamping surfaces wear down.

The plate L may be made detachable from the frame C and segment by removable pins or bolts, as in the case of the plates M. If desired, the segment I and lever H might be secured to the frame A, and the lower ends of links K pivoted to the plate L.

This gripping device is secured to the car in the following novel manner: The frame A has its ends resting upon a rectangular metal frame, P, supported upon guides S' on the frame-timbers S of the car, and said frame P is adapted to have lateral or a slight longitudinal motion to allow the car to have a slight movement independently of the gripping device. To retain the frame A in position upon frame P, I rivet blocks $P^2$ to extensions P' of frame P, the said blocks having vertical notches $p$, into which the rounded ends of the frame A are supported against longitudinal and lateral movement. To prevent the frame A from rising I secure it down by caps R, which are secured by bolts Q, and are prevented from turning by notch $r'$ and lug $r$. The frame P is then stretched between cross-bars $S^2$ by rods T, and is allowed a small cushioning action by rubber or metallic springs $T^2$, located between the plate $S^2$ and cap T', held in place by nuts $t$.

The mechanism shown in Fig. 11, and just described, is the same on the other end of the car, one-half only being shown in that drawing.

The foregoing specification is drawn in accordance with what I have put into practical use, and therefore, while I prefer that construction, even to its details, it is to be understood that I do not limit myself thereto, as the construction may be modified in various ways without departing from my invention.

Having now described my invention, what I claim as new, and desire to secure by Letters Patent, is—

1. A gripping device for cable railways, which consists of a frame supported by the car and carrying a stationary gripping-jaw, in combination with a movable jaw carried by said frame or its appendages, thin flat plates adapted to extend through the slot in the conduit secured to said jaws, and an operating-lever carried by the plate of said movable jaw and connected to the plate of the fixed jaw, substantially as and for the purpose specified.

2. A gripping device for cable railways, which consists of a frame supported by the car and carrying a stationary gripping-jaw, in combination with a movable jaw carried by said frame or its appendages, thin flat plates adapted to extend through the slot in the conduit secured to said jaws, and an operating-lever carried by the plate of said movable jaw and connected to the plate of the fixed jaw, and a locking-segment for said lever also carried by the plate of the movable jaw, so that it rises and falls with the operating-lever, substantially as and for the purpose specified.

3. A gripping device for cable railways, which consists of a pair of stationary jaws and vertical supporting plates or bars connecting said jaws with the car through the slot, in combination with a pair of movable jaws arranged above the stationary jaws, forming therewith two sets of clamping-jaws, having free lateral passages thereto, the said movable jaws being guided upon the vertical plates of the stationary jaw, substantially as and for the purpose specified.

4. In a gripping device for cable railways, the combination, with two jaws, the lower of which is stationary and the upper of which is movable, of adjustable guiding-rollers at the ends of said jaws, substantially as described.

5. In a gripping device for cable railways, the combination of gripping-jaws with throw-off rollers and devices for throwing said rollers into action for throwing the cable out of the grip, substantially as described.

6 in a gripping device for cable railways, the combination of gripping-jaws with throw-off devices having angular faces to act upon the cable to throw it out of the said jaws and an operating-lever adapted to actuate both the gripping-jaws and throw-off device, substantially as described.

7. In a gripping device for cable railways, the combination of gripping-jaws with throw-off devices having angular faces to act upon the cable to throw it out of the said jaws and an operating-lever adapted to actuate both the gripping-jaws and throw-off device, the said lever being adapted to actuate said gripping-jaws and throw-off device in succession, and when moved to its full extent resets the said throw-off device, substantially as described.

8. A gripping device for cable railways, having two sets of jaws, one of which is located on each side of the support connecting said jaws with the car, in combination with vertical and horizontal guiding-rollers arranged at each end of said jaws, substantially as described.

9. A gripping device for cable railways, having two sets of jaws, one of which is located on each side of the support connecting said jaws with the car, and having the entrances to said jaws for the insertion of the cable open on opposite sides, in combination with horizontal and vertical guide-rollers at each end of said jaws, the former of which are movable vertically upon their spindles, substantially as described.

10. In a gripping device for cable railways, a movable gripping-jaw, a frame to support said jaw and guide it, a lever pivoted to said jaw, and a movable fulcrum for said lever, the said fulcrum being made to move substantially in a horizontal line, substantially as described.

11. A supporting-frame for the gripping-jaws, made comparatively narrow and long, and from which the gripping apparatus is suspended, whereby the entire apparatus may be readily removed or handled, substantially as described.

12. In a gripping device for cable railways, a jaw made with recesses, in combination with wearing-blocks adapted to rest in said recesses and be carried by said jaw, substantially as described.

13. In a gripping device for cable railways, the gripping mechanism proper, supported from above the slot by heavy end plates or bars, in combination with a vertical operating-plate for the movable jaw, arranged between said end bars and made of less thickness than the said end bars, substantially as and for the purpose specified.

14. In a gripping device for cable railways, the gripping mechanism proper, in combination with the operating mechanism and the shank formed of vertical plates M M and L, in which the plate L is of less thickness than the plates M M, to enable a corner to be turned without abrading the said plate L, substantially as described.

15. In a gripping device for cable railways, the stationary gripping-jaw and its reversible supporting and guide plates, so that when said plates become worn they can be turned end for end, substantially as described.

16. The combination of the gripping-jaws with bell shaped roller G, lifting-hook $b'$, pin $c$, carried by one of said jaws and adapted to lift said hook $b'$ and the roller G, and means to free said hook from said pin when fully raised, to allow the said roller to fall to its normal position, substantially as described.

17. The combination, in a cable railway, of the movable jaw and stationary jaw, the said jaws being provided with extensions and recesses, whereby said jaws are prevented from lateral movement relatively, substantially as described.

18. The combination of the car-timbers S with the frame P, inclosing the grip proper, and provided on each end with the receiving-boxes $P^2$, having recesses $p$, the frame A of the grip adapted to fit in between the said boxes being received in the recesses $p$, rods T, and springs T', substantially as and for the purpose specified.

19. The combination of the frame A of a gripping device with rectangular frame P, made to inclose the gripping device proper on all four sides, rods T, and supporting-frame of the car, substantially as described.

20. The combination of frame A of a gripping device with frame P, having blocks $P^2$, caps R, rods T, and supporting-frame of the car, substantially as described.

21. In a gripping device for cable railways, the combination of two gripping-jaws with vertical movable guide-rolls having cylindrical upper parts and expanded lower portions, and mechanism for elevating them, whereby the cylindrical parts of said rollers prevent the cable from running against the shank of the jaws, and the expanded parts are adapted to unship the cable when desired, substantially as described.

In testimony whereof I have hereunto set my hand.

ASA E. HOVEY.

Witnesses:
G. S. HARDING,
GEORGE H. SONNEBORN.